United States Patent  
Rector et al.

(10) Patent No.: US 8,257,623 B2  
(45) Date of Patent: Sep. 4, 2012

(54) EXTRUSION DIE FLOW MODIFICATION AND USE

(75) Inventors: John Charles Rector, Beaver Dams, NY (US); David Robertson Treacy, Jr., Horseheads, NY (US); Kevin Lee Wasson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 428 days.

(21) Appl. No.: 12/548,891

(22) Filed: Aug. 27, 2009

(65) Prior Publication Data

US 2011/0049743 A1    Mar. 3, 2011

(51) Int. Cl.
  *B29C 47/92* (2006.01)
  *B28B 17/00* (2006.01)
(52) U.S. Cl. ....... 264/40.1; 264/630; 264/638; 264/162; 264/177.12
(58) Field of Classification Search .................. 264/630, 264/631, 177.11, 177.12
See application file for complete search history.

(56) References Cited

U.S. PATENT DOCUMENTS

| 5,766,538 A * | 6/1998 | Kossmann ..................... 264/407 |
| 6,039,908 A * | 3/2000 | Brew et al. ............... 264/177.12 |
| 2006/0027951 A1* | 2/2006 | Peterson ....................... 264/631 |
| 2006/0178769 A1 | 8/2006 | Brew |

FOREIGN PATENT DOCUMENTS

EP    17686    10/1983

* cited by examiner

*Primary Examiner* — Matthew Daniels
*Assistant Examiner* — Erin Snelting
(74) *Attorney, Agent, or Firm* — Joseph M. Homa; Matthew J. Mason

(57) ABSTRACT

An extrusion die is processed to alter the flow of extrudable material through the die by collecting data reflecting flow variations across the face of the die, constructing a graded resistance flow restrictor utilizing the data, and forcing an abrasive machining medium through the flow restrictor and die with the flow restrictor being arranged to deliver higher abrasive flow through die portions initially exhibiting low extrusion rates, the resulting die being useful for the manufacture of ceramic honeycomb bodies exhibiting a reduced incidence of shape defects attributable to die flow variations.

16 Claims, 2 Drawing Sheets

| | |
|---|---|
| ▨ | > 30 mm |
| ☐ | > 30.8 mm |
| ▧ | > 32.6 mm |
| ▥ | > 35.25 mm |
| ☐ | > 30 mm |

EXTRUSION DIE FLOW MODIFICATION AND USE

BACKGROUND

1. Field

The present application generally relates to the manufacture of ceramic honeycombs of the kinds presently used as catalyst carriers and porous filters for the control of exhaust emissions from internal combustion engines. More particularly, the disclosed methods pertain to honeycomb extrusion dies and extrusion processes by means of which plasticized mixtures of ceramic-forming materials are formed into ceramic honeycomb bodies for various uses.

2. Background

Non-uniform rates of extrusion across the faces of honeycomb extrusion dies used to form plasticized mixtures of ceramic-forming materials into green honeycomb shapes are a problem encountered in the manufacture of ceramic honeycombs. While many variables in the extrusion process can affect honeycomb extrudate shape and final product quality, die defects can be complicated and expensive to address.

SUMMARY

The methods of the present disclosure include methods for evaluating the uniformity of flows of extrudable material from all or portions of the discharge faces of honeycomb extrusion dies. In accordance with those methods the dies are first filled with an extrudable material and then a substantially uniform pressure is applied to the material at the upstream end or inlet face of the die. That pressure is sufficient to cause at least some of the extrudable material to protrude from the die across at least a portion of the die discharge face at the downstream end of die.

As a result of this extrusion, a contour of extruded material is formed on the discharge face that exhibits flow front height variations resulting from differences in extrudate flow rates through the die over different lateral locations across that face. The resulting contour thus includes at least a portion of the extruded material protruding from the discharge face by a maximum distance, i.e., having a maximum flow front height, and may include a portion of the extruded material protruding from the discharge face by a minimum distance, i.e., having a minimum flow front height. The contour thus formed is then subjected to beam scanning to collect a data set that includes numerical values correlating the various flow front heights with their respective lateral discharge face positions across the discharge face of the die.

The disclosure further provides methods for modifying an extrusion die to alter a flow of extrudable material through the die. Those methods comprise collecting a data set that correlates each one of a set of extrudable material flow front heights z of an extrudable material extruded through the die in an extrusion direction with a corresponding set of lateral location coordinates x and y referencing a discharge location on a discharge face of the die. The flow front heights z may be determined from a calculated or observed flow of extrudable material from the die. The data set thus collected is then surveyed to determine at least a minimum flow front height and the corresponding lateral location coordinates for that minimum flow front height for the die to be modified, these being conveniently designated, for example, as zMIN, xMIN, and yMIN, respectively.

A graded resistance flow restrictor is then positioned upstream of the die, for example proximate to the inlet face of the die. The flow restrictor has a minimum flow resistance portion, and is oriented so that the minimum flow resistance portion is disposed upstream of the lateral location coordinates xMIN and yMIN on the discharge face of the die that correspond to the location of the minimum flow front height zMIN for the die. With the flow resistor thus positioned, an abrasive extrudable material is forced through the flow restrictor and the die for a time and at a flow rate at least sufficient to preferentially abrade that section of the die having the lateral location coordinates xMIN and yMIN corresponding to the location of minimum flow front height zMIN. That is, the die section at lateral location coordinates xMIN and yMIN is abraded to a greater extent than sections of the die spaced away from coordinates xMIN and yMIN.

Through adaptations of the foregoing methods the disclosure further provides improved methods for the manufacture of ceramic honeycomb bodies via the extrusion of plasticized ceramic mixtures through honeycomb extrusion dies. In accordance with those improved methods, a honeycomb extrusion die is filled with a first extrudable material, and a substantially uniform pressure is applied to that material at the upstream end or inlet face of the die. The pressure applied is sufficient to cause at least some of the extrudable material to protrude from the discharge face of the die in an extrusion direction D.

The substantially uniform pressure is then reduced sufficiently to cause the first extrudable material to slow or stop exiting from the discharge face, whereby a quantity of extruded material protruding from the discharge face is provided that forms a contour arising from variations in flow front heights z across a lateral plane parallel to the discharge face of the die. That contour includes a minimum flow front height, designated zMIN for convenience, corresponding to the point or points of least protrusion in the extrusion direction of extruded material from the discharge face.

The contour thus produced is then characterized by beam scanning to collect a data set that includes numerical values correlating the various flow front heights with their respective lateral coordinates across the discharge face of the die. That data set would include, for example, a set of lateral location coordinates (xMIN, yMIN) corresponding to the minimum contour value zMIN.

A graded resistance flow restrictor is next inserted upstream of the die, that flow restrictor having a minimum flow resistance portion disposed upstream of lateral location coordinates xMIN and yMIN on the discharge face of the die. An abrasive extrudable material is then forced through the flow restrictor and the die for a time and at a flow rate sufficient to abrade a section of the die having coordinates xMIN and yMIN to a greater extent than regions of the die spaced away from coordinates xMIN and yMIN. The effect of that abrasion is to increase the flow rate of extrudable material through the die at the xMIN, yMIN coordinates.

The flow restrictor is then removed from its location upstream of the die, and a plasticized mixture of a ceramic-forming material to be used for the manufacture of a ceramic honeycomb is then forced through the die to form a green preform. Finally, the green preform is dried and fired to produce the desired ceramic honeycomb body.

BRIEF DESCRIPTION OF THE DRAWINGS

The presently disclosed methods are more particularly described below with reference to the appended drawings, wherein:

FIGS. 3a-3d illustrate one embodiment of a method of the disclosure, wherein:

FIG. 3a illustrates a first step of the method embodiment;

FIG. 3b illustrates an intermediate step of the method embodiment;

FIG. 3c illustrates a further intermediate step of the method embodiment; and

FIG. 3d illustrates a final step in the method embodiment.

DETAILED DESCRIPTION

While the methods of the present disclosure have useful application to a wide variety of extrusion die designs and flow problems associated therewith, the methods disclosed herein offer particular advantages for the evaluation and correction of flow problems in honeycomb extrusion dies. Accordingly, the following description includes illustrations of particular embodiments of those methods involving honeycomb extrusion dies even though such methods are not limited thereto.

Figure 1:
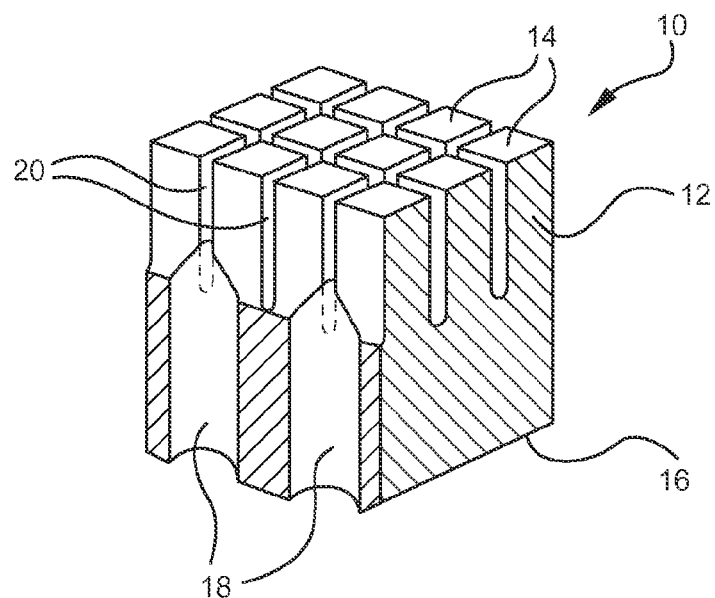
FIG. 1 is a schematic illustration of a prior art honeycomb extrusion die.

Honeycomb extrusion dies are characterized by particularly complex internal geometries, as illustrated in FIG. 1 of the drawing. As schematically shown in FIG. 1, an exemplary honeycomb extrusion die 10 comprises a die body 12 having an inlet face 14 at an upstream end of the die with respect to an extrusion direction D through the die, and a discharge face 16 at a downstream end of the die with respect to that extrusion direction. An array of feedholes 18 extending into die body 12 from inlet face 14 connects with an array of crisscrossing discharge slots 20 extending toward and opening onto discharge face 16 of the die. A ceramic-forming mixture (not shown) introduced into the feedholes can be conveyed through and extruded from the slots in the form of a green honeycomb extrudate. Non-uniform extrudate extrusion rates result in defects such as extrudate curvature or bending (termed "bowing") as well as deformities or discontinuities in the channels and channel walls of the extruded shapes.

The presently disclosed methods are also compatible with known honeycomb dies, including advanced honeycomb dies formed of materials such as wear-resistant metals that are well adapted for the extrusion of plasticized mixtures of powdered ceramic precursors, because many such honeycomb dies embody at least some die manufacturing errors that create non-uniformity of flow. Small errors in discharge slot spacing, for example, can cause batch to flow more rapidly from the resulting wider slots and slower from the adjacent smaller slots. Other variations in the dimensions and internal surface finishes of the slots, as well as variations such as feedhole diameter and finish variations, can also affect flow rates.

Manual methods for locating regions of slow flow, and for improving flow through those regions by selectively polishing or opening constricted flow regions of the dies, can be used to raise the performance of a defective die to a minimally effective level. However, manual flow-front evaluation methods are relatively slow, inaccurate, and subject to operator error.

Embodiments of the methods of the present disclosure comprise first filling a honeycomb die with an extrudable material and applying a substantially uniform pressure to the material at the upstream end or inlet face of the die that is sufficient to cause at least some of the extrudable material to exit the die at the downstream end. A contour of extruded material or extrudate on the downstream end of the die will form that exhibits variations in flow front height over lateral locations on the discharge face. Those height variations will range from portions of the extruded material protruding from the discharge face by a maximum distance, as the result of more rapid flow through the die, as well as portions of the extruded material protruding from the discharge face by a minimum distance, as the result of slower flow through the die.

The contour of extruded material thus provided is next subjected to beam scanning to rapidly and accurately record the variations in flow front height. Beam scanning enables the collection of a data set that includes numerical values corresponding to flow front height values with respective lateral discharge face positions across the discharge face of the die. The data set thus corresponds to a map of flow front heights as a function of die discharge face location. In some embodiments of the described evaluation method, a step of reducing the substantially uniform pressure sufficiently to cause the extrudable material stop exiting from the discharge face prior to the step of beam scanning is included. That step produces a static contour and extends the time over which the scanning may be conducted.

Various types of beam scanning can be employed; laser scanning, IR scanning, or other electromagnetic beam scanning methods are examples. Where laser scanning is the selected scanning method, a laser scanning system selected from the group consisting of interferometric laser systems and distance triangulation laser systems can be used. Scanning embodiments wherein the scanned field is extended to include scanning the discharge face of the extrusion die are also useful. In some embodiments the maximum flow front height or distance of protrusion of the extruded material from the discharge face will be less than 5 cm, since the material is plastic and sagging of the contour during scanning is to be avoided. It is desirable that the contour of the extruded material remain intact until the beam scanning has ended.

The foregoing methods, and other methods for evaluating the flow uniformity of honeycomb extrusion dies, comprise steps in the methods herein disclosed for modifying such extrusion dies to alter the flow of extrudable material therethrough. As generally disclosed above, such die modification methods initially involve a step of collecting a data set that correlates each one of a set of extrudable material flow front heights z through the die in an extrusion direction D with a corresponding set of lateral location coordinates x and y referencing a discharge location on a discharge face of the die. The flow front heights may be determined from calculated or observed flows of extrudable material through the die.

The data set thus collected is then surveyed to determine at least a minimum flow front height value together with the corresponding lateral location coordinates for that minimum flow value for the die to be modified. A graded resistance flow restrictor including a lateral section offering minimum flow resistance is then positioned upstream of the die, for example proximate to the inlet face of the die. That flow restrictor is oriented by rotation about the extrusion direction z so that the section of minimum flow resistance is disposed upstream of the lateral discharge face location coordinates corresponding to the location of the minimum flow value for the die.

After the flow resistor has been positioned, an abrasive extrudable material is forced through the flow restrictor and the die for a time and at a flow rate effective to preferentially abrade and relieve that section of the die corresponding to the location of the minimum flow value through the die. In some embodiments, the flow of abrasive material is continued until the die section of minimum flow, and other die sections of intermediate flow, approach or reach flow levels equivalent to those of die sections corresponding to locations of maximum extrudate flow through the die.

Embodiments of these die flow modification methods that employ beam scanning steps to collect the data set correlating flow rates with die discharge face locations offer a number of advantages over other methods for collecting such data. For example, laser beam scanning methods and systems offer non-contact measurements that avoid distorting the extrudate, and can provide measurement accuracies as much as 10 times greater than manual measurement methods. Further, they offer very short scan times and can directly provide digital data for use in programmable machine systems for die fabrication and correction.

Alternatively, however, as will be recognized from the foregoing description, data sets applicable to the practice of the described methods may be collected via older manual measurement methods, or even using known numerical honeycomb die flow modeling techniques. For example, a data set reflecting the flow profile of an extrusion die comprising numerical flow front height values z calculated at least in part from variations in geometric parameters and/or surface finish parameters collected from one or more of the die inlet face, the die feedholes, the die discharge slots, and the die discharge face, can be used for this purpose.

In some embodiments of the disclosed methods the graded resistance flow restrictor is a fluid-permeable block or plate placed ahead or upstream of the extrusion die, usually close to or in contact with the die inlet face, that provides a varying or graded resistance to fluid flow as a function of lateral position (two coordinates) over the die inlet face. For any given set of die lateral coordinates, the total resistance to material flow through the assembly of the die and flow restrictor may be computed as the sum of the flow resistance of the flow restrictor and the flow resistance of the die at those lateral coordinates. The restrictor is designed such that this total resistance is lower in areas where more flow of abrasive material is desired and higher in areas where less flow is desired. The resistances can be determined experimentally or numerically computed.

One suitable material for the fabrication of a graded resistance flow restrictor is a porous material such as a foamed metal that can be shaped to have a thickness profile providing a profiled resistance to fluid flow. A CAD/CAM machine tool is programmed to machine a profile onto the face of a block of such a material utilizing a data set collected from a beam scan of an extrudate profile formed on the discharge face of an extrusion die. Another flow-permeable plate that could be similarly profiled is a plate of an UHMW polymer that has been molded or machined to include through-holes in a pattern matching the feed hole openings on the inlet face of the extrusion die.

An alternative flow restrictor design not requiring thickness profiling for its fabrication comprises a rigid plate of uniform thickness incorporating a plurality of through holes in an array of laterally varying hole spacing, the varying hole spacing providing laterally varying flow resistance. Such a plate can be machined utilizing CAD/CAM drilling equipment programmed with the same data set used to machine surface-profiled flow restrictors.

Abrasive extrudable materials suitable for modifying the flow characteristics of extrusion dies include the same plasticized ceramic-forming mixtures employed for ceramic honeycomb manufacture. However, in some embodiments such mixtures are not optimal, either for flow profiling or for abrasive machining, because their flow characteristics can be significantly affected by variations in composition, mixing uniformity, and temperature. Accordingly, abrasive compositions offering more stable and reproducible flow characteristics can be used, including those commercially available.

Examples of desirable extrudable materials for flow profiling include the abrasive compositions sold by the Extrude Hone Corporation of Erwin, Pa., U.S.A. More generally, compositions comprising carrier mixtures of siloxane polymers and aliphatic hydrocarbon lubricants filled with carbide grit abrasives can be formulated to offer consistent chemistry and physical uniformity, providing Theological properties that are generally affected only by temperature. If desired, such compositions can be formulated to provide flow characteristics very similar to those of extrudable mixtures of ceramic-forming materials, making them well suited for use to generate die flow front profiles for beam scanning, as well as for abrasive machining.

The flow profiling methods disclosed above are further illustrated by the following example, which is illustrative.

Example

A honeycomb extrusion die comprising a die body, a plurality of feedholes extending into the die body from the inlet face toward the die discharge face, and a plurality of discharge slots in extending into the die body from the discharge face toward and connecting with the feedholes, is selected for flow evaluation.

To conduct that evaluation, the die is mounted in the barrel of a ram extruder filled with an extrudable material having flow characteristics similar to those of an extrudable mixture of ceramic-forming materials useful for ceramic honeycomb manufacture. The extrudable material selected for this purpose is Extrude Hone EH abrasive machining compound, commercially available from the Extrude Hone Corporation of Irwin, Pa. The extruder is then activated to purge air from the die and extruder cavities upstream of the die, with extruder pressure continuing until the die is fully filled.

After the die has been filled with the material, the extrusion is stopped and the discharge face of the die is cleaned to free the face of material. The extrusion is then restarted at a slow rate, the piston applying a substantially uniform pressure to the reservoir of extrudable material disposed at the upstream end of die, and extrusion being continued for about one minute until extrudate issuing from the die stands some distance above the die discharge face. The uniform extrusion pressure is then reduced and the flow of extrudable material from the die is stopped, leaving a collection of extruded material protruding from the discharge face in the form of a flow profile or contour. That contour is produced by variations in flow front height, i.e., differences in the heights or distances that the extruded material stands away from the discharge face of the die, those differences resulting from differing flow rates of extrudable material through laterally differing locations across the discharge face of the die.

A laser scanner system is next used to scan the contoured face of the extruded material to produce a point cloud or data set of three-coordinate data points, each point representing the height that the extruded material stands above the die discharge face as a function of the two lateral discharge face location coordinates. In terms of an x-y-z coordinate system, beam scanning of the contour collects a data set correlating the flow front height values z with the lateral location coordinates x,y, the variations in the flow front height values z reflecting the contour variations across the lateral plane. In that system, the minimum flow front height value zMIN is correlated with lateral discharge face locations xMIN and yMIN, while the maximum flow front height value zMAX is correlated with the lateral discharge face locations xMAX and yMAX of the point of maximum height. A commercially available NextEngine HD laser scanner from NextEngine, Inc., Santa Monica, Calif., U.S.A. is used to conduct this scan.

Scanning performance specifications such as set forth in Table I below are suitable for collecting flow front profile information of useful precision for the purpose of scanning an extrudate flow front profile as described above:

TABLE I

Laser Scanner Specifications

|  | Macro Mode | Wide Mode |
| --- | --- | --- |
| Field Size | 5.1 × 3.8" | 13.5 × 10.1" |
| Range | 5-9" | 15-22" |
| Accuracy | +/−0.005" | +/−0.015" |
|  | +/−0.13 mm | +/−0.38 mm |
| Resolution | 0.0025" | 0.0067" |
|  | 0.06 mm | 0.17 mm |

Figure 2:
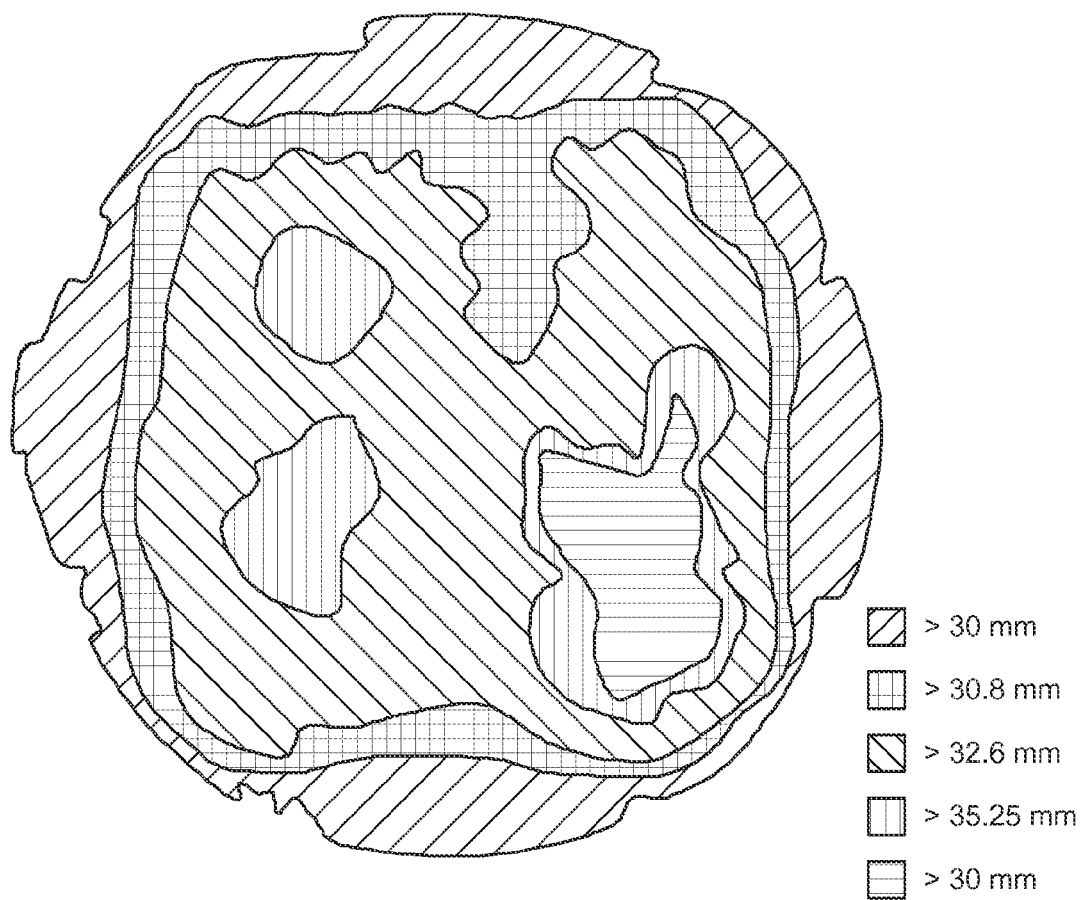
FIG. 2 is a schematic map of a honeycomb die flow profile.

After scanning has been completed, the raw scan data is processed to subtract a flat plane representing the discharge face of the die, yielding values reflecting only flow front heights or distances above the plane of the die discharge face. The results are schematically illustrated in FIG. 2 of the drawings, which presents an illustrative contour or flow front map generated from data such as collected by beam scanning in accordance with the foregoing Example. For purposes of illustration, only six ranges of flow front height values z are shown in the table in FIG. 2, even though profile data covering a much larger number of levels can readily be generated. The number of levels of flow front height data collected is in fact limited only by the depth resolution of the beam scanner. The flow front height (z) value ranges mapped in FIG. 2 range from a minimum flow front height value somewhat above 30 mm from the die discharge face to a maximum flow front height value in excess of 36.125 mm from the die discharge face.

Figure 3A:
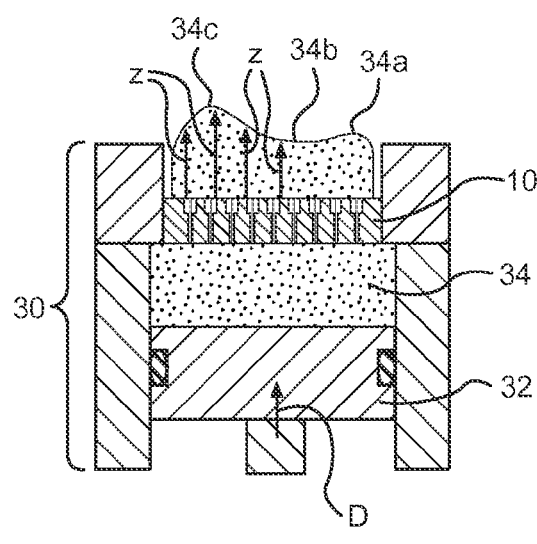

A schematic illustration of the practice of one embodiment of the foregoing methods is presented in FIGS. 3a-3d the drawings. As shown in those figures, a honeycomb extrusion die 10 is mounted in the barrel of a ram extruder 30 that includes a piston 32 adapted to apply uniform pressure to a body of a first extrudable material 34 disposed upstream of die 10. As illustrated in FIG. 3a, that uniform pressure has been applied to force a quantity of the first extrudable material 34 through die 10 in extrusion direction D to form an extrudate profile 34a on the discharge face of die 10. Extrudate profile 34a is shaped by variations in flow front heights such as heights z resulting from variations in extrudable material flow rates through die 10. Profile 34a includes a section 34b corresponding to a region of minimum flow front height z through die 10, and a section 34c corresponding to a region of maximum flow front height z through the die.

As was the case in the beam-scanning Example described above, the first extrudable material may be of the same composition type as the abrasive extrudable material to be utilized to modify the flow characteristics of the die in later stages of the disclosed methods, or it may be a plasticized mixture of ceramic-forming material. By the same composition type is meant comprising the same or similar vehicle constituents and the same or similar abrasive or ceramic-forming solids.

Figure 3B:
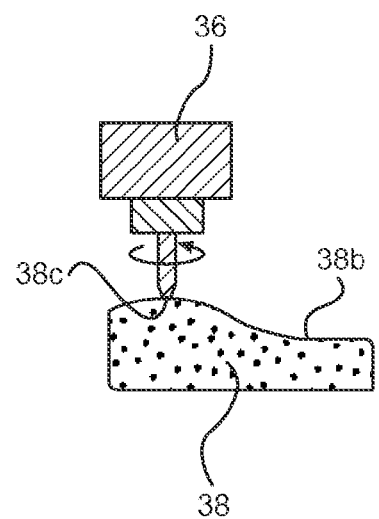

Following the collection of a data set mapping extrudate profile 34a of FIG. 3a as generally described in the above Example, a graded resistance flow restrictor is fabricated as illustrated in FIG. 3b. A fabrication material such as a foamed metal is machined utilizing a CAD-CAM machine tool 36 programmed with the data set to form a graded resistance flow restrictor 38 of the foamed metal. The flow restrictor has a profile mirroring extrudate profile 34a shown FIG. 3a. That profile includes a relatively thin region 38b and a relatively thick region 38c, those regions providing minimum and maximum flow resistance, respectively, through flow restrictor 38.

Figure 3C:
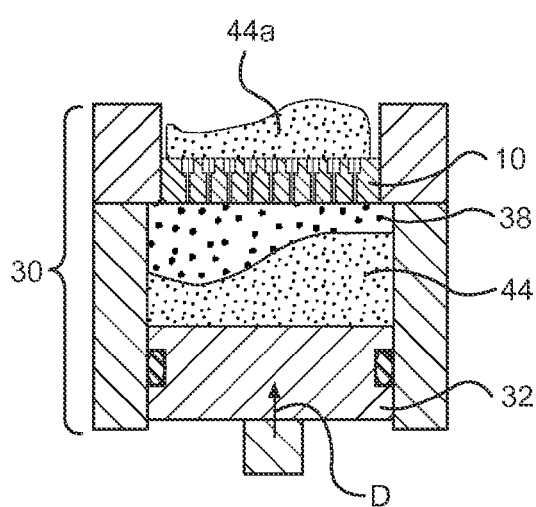

FIG. 3c illustrates the step of abrading extrusion die 10 in a manner effective to increase extrudable material flow through that section of the die exhibiting minimum flow as reflected in extrudate profile 34a shown in FIG. 3a. As shown in FIG. 3c, flow restrictor 38 is positioned within the barrel of ram extruder 30 upstream of extrusion die 10 with reference to extrusion direction D. Ram extruder 30 contains a charge of an abrasive extrudable material 44 which has been forced by piston 32 through flow restrictor 38 and die 10 to selectively abrade the die.

The wear profile of the illustrated selective abrasion is indicated by the profile of extruded abrasive material 44a on the discharge face of die 10 in FIG. 3c, which profile illustrates a higher volume of extrudable material forced through the die section exhibiting minimum extrudate flow in FIG. 3a than through other sections of the die. As was the case with the profiling step of FIG. 3a, the step of forcing the abrasive extrudable material through the restrictor is done by the application of a substantially uniform pressure (e.g., via piston 32) to the abrasive extrudable material at an upstream end of the flow restrictor.

Figure 3D:
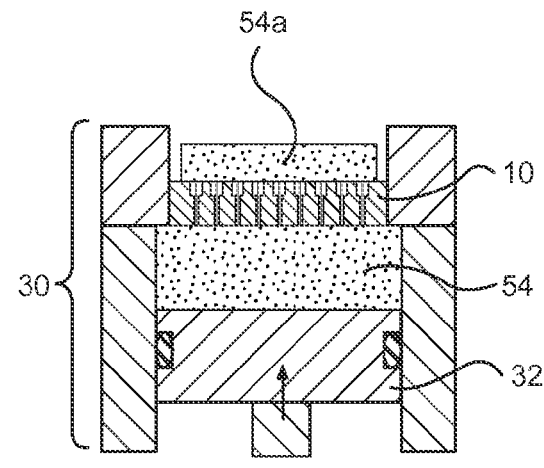

Following the completion of the selective machining process illustrated in FIG. 3c, extrusion die 10 is used to form a charge of a plasticized mixture of ceramic-forming material 54 into a length of ceramic-forming extrudate 54a, as schematically shown in FIG. 3d of the drawings. In the extrusion arrangement shown, a substantially uniform pressure is applied to the ceramic-forming material upstream of the die by the piston 32 of the ram extruder, and a uniform length of ceramic-forming extrudate 54a is thereby delivered from the die.

In contrast to the extrusion behavior exhibited by die 10 in FIG. 3a of the drawings, ceramic extrudate 54a produced by die 10 as processed in FIG. 3c has an extrudate profile of substantially uniform flow front height, extrusion die flow variations having been significantly reduced from those variations producing profile 34a in FIG. 3a. Such reductions are achievable even though the plasticized mixture of ceramic-forming material and the abrasive extrudable material are of differing composition, and thus may have somewhat different flow characteristics. Similar reductions in flow variation are seen even where the plasticized mixtures of ceramic-forming material are extruded through flow-modified dies via a screw extruder rather than a ram extruder.

The manufacture of a ceramic honeycomb from a length of extruded plasticized ceramic-forming material delivered from a flow-modified die provided as in FIGS. 3a-3d of the drawings is in accordance with conventional practice. Following extrusion, the resulting green preforms are dried and fired to convert the ceramic-forming material to a durable ceramic material, providing fired ceramic honeycomb bodies at increased select rates and with a very low incidence of shape defects attributable to unbalanced extrusion die flow rates.

Thus, the methods of the present disclosure can provide a way to more precisely evaluate flow front variations and to address the variations in a consistent manner to produce honeycomb dies with more uniform flow front characteristics by, among other features, more fully, rapidly, and accurately evaluating the flow uniformity of extrusion dies.

The advantages of profiled abrasive extrusion die machining using flow front information collected from individual extrusion die flow profiles are substantial. The selective abrasion profiles employed are automatically and objectively developed, rather than subjectively determined from a visual examination of a die flow profile, and the flow profile data collected is in a digital form well suited for the programming of automated machining equipment for flow restrictor fabrication. The resulting gradations in abrasive material flow across the face of the extrusion die are smooth and without discontinuities, since simple masks that either block or allow abrasive flow need no longer be employed.

While the methods disclosed herein have been described above with respect to particular embodiments, it will be recognized that those embodiments have been presented for purposes of illustration only, and that various adaptations and modifications of the disclosed methods may be developed for existing as well as future applications within the scope of the appended claims.

What is claimed is:

1. A method of modifying an extrusion die to alter a flow of extrudable material through the die comprising:
    collecting a data set that correlates each one of a set of extrudable material flow front heights z in an extrusion direction D through the die with a corresponding set of lateral location coordinates x,y referencing a discharge location on a discharge face of the die, the flow front heights z being determined from calculated or observed flows of extrudable material through the die;
    determining a minimum flow front height zMIN and corresponding lateral location coordinates xMIN and yMIN from the data set;
    inserting a graded resistance flow restrictor upstream of the die, the flow restrictor having a minimum flow resistance portion disposed upstream of lateral location coordinates xMIN and yMIN on the discharge face of the die;
    forcing an abrasive extrudable material through the flow restrictor and the die for a time and at a flow rate sufficient to abrade a section of the die having coordinates xMIN and yMIN to a greater extent than sections of the die spaced away from coordinates xMIN and yMIN; and
    removing the flow restrictor from upstream of the die.

2. The method of claim 1 wherein the extrusion die is a honeycomb extrusion die comprising a die body, a plurality of feedholes extending into the die body from the inlet face toward the die discharge face, and a plurality of discharge slots extending into the die body from the discharge face toward and connecting with the feedholes.

3. The method of claim 2 wherein the step of collecting the data set includes a step of calculating numerical flow values through the honeycomb extrusion die, said flow values being calculated at least in part from variations among geometric parameters and/or surface finish variations among one or more of the die inlet face, feedholes, discharge slots and discharge face.

4. A method of modifying an extrusion die according to claim 1 wherein the step of collecting the data set comprises the steps of:
    filling the die with a first extrudable material;
    applying substantially uniform pressure to the first extrudable material at an upstream end of the die, the pressure being sufficient to cause at least some of the extrudable material to protrude from the discharge face of the die in the extrusion direction D;
    reducing the substantially uniform pressure sufficiently to cause the first extrudable material to slow or stop exiting from the discharge face, whereby the extruded material protruding from the discharge face forms a contour exhibiting contour height variations across a lateral plane parallel to the discharge face;
    beam scanning the contour to collect the data set of extrudable material flow front height values z
    correlating the extrudable material flow front height values z with the corresponding lateral location coordinates x,y; and
    setting the minimum flow front height value zMIN equal to the minimum contour height collected by beam scanning.

5. The method of claim 4 wherein a maximum flow front height value zMAX is set equal to a maximum contour height collected by beam scanning, and wherein lateral die discharge coordinates xMAX and yMAX are die discharge face coordinates for the maximum flow front height.

6. The method of claim 5 wherein the flow restrictor has a maximum flow resistance portion disposed upstream of lateral location coordinates xMAX and yMAX on the discharge face of the die.

7. The method of claim 4 wherein the first and abrasive extrudable materials are the same composition type.

8. The method of claim 1 wherein forcing the abrasive extrudable material comprises applying substantially uniform pressure to the abrasive extrudable material at an upstream end of the flow restrictor.

9. The method of claim 1, wherein the graded resistance flow restrictor has a profile machined on at least one face utilizing data collected from the data set.

10. The method of claim 1, wherein the graded resistance flow restrictor comprises a rigid plate of uniform thickness comprising a plurality of through holes in an array of laterally varying hole spacing.

11. A method of manufacturing a ceramic honeycomb body by extruding a plasticized mixture of ceramic-forming material mixture through a honeycomb die comprising:
    filling the die with a first extrudable material;
    applying substantially uniform pressure to the first extrudable material at an upstream end of the die, the pressure being sufficient to cause at least some of the extrudable material to protrude from the discharge face of the die in an extrusion direction D;
    reducing the substantially uniform pressure sufficiently to cause the first extrudable material to stop exiting from the discharge face, wherein the extruded material protruding from the discharge face forms a contour with variations in flow front height across a lateral plane parallel to the discharge face, including a minimum flow front height value, zMIN;
    beam scanning the contour to collect a data set, including numerical values correlating flow front height variations in the contour with respective lateral coordinates across the discharge face of the die, and including lateral coordinates (xMIN, yMIN) corresponding to the lateral location of zMIN;
    inserting a graded resistance flow restrictor upstream of the die, the flow restrictor having a minimum flow resistance portion disposed upstream of lateral location coordinates xMIN and yMIN on the discharge face of the die;
    forcing an abrasive extrudable material through the flow restrictor and the die for a time and at a flow rate sufficient to abrade a section of the die having coordinates xMIN and yMIN, to a greater extent than regions of the die spaced away from coordinates xMIN and yMIN;
    removing the flow restrictor from upstream of the die;
    forcing the plasticized mixture of ceramic-forming material though the die to form a green preform, and drying and firing the green preform to form a ceramic honeycomb body.

12. The method of claim 11 wherein the abrasive extrudable material and the plasticized mixture of ceramic-forming material are of differing composition.

13. The method of claim 11 wherein the substantially uniform pressure is applied to the first extrudable material via a ram extruder.

14. The method of claim 13 wherein the plasticized mixture of ceramic-forming material is forced through the die via a screw extruder.

15. The method of claim 11, wherein the graded resistance flow restrictor has a profile machined on at least one face utilizing data collected from the data set.

16. The method of claim 11, wherein the graded resistance flow restrictor comprises a rigid plate of uniform thickness comprising a plurality of through holes in an array of laterally varying hole spacing.

* * * * *